Feb. 4, 1969 S. KASE 3,426,345
STATIC DIGITAL TO ANALOG CONVERTERS
Filed Dec. 24, 1964
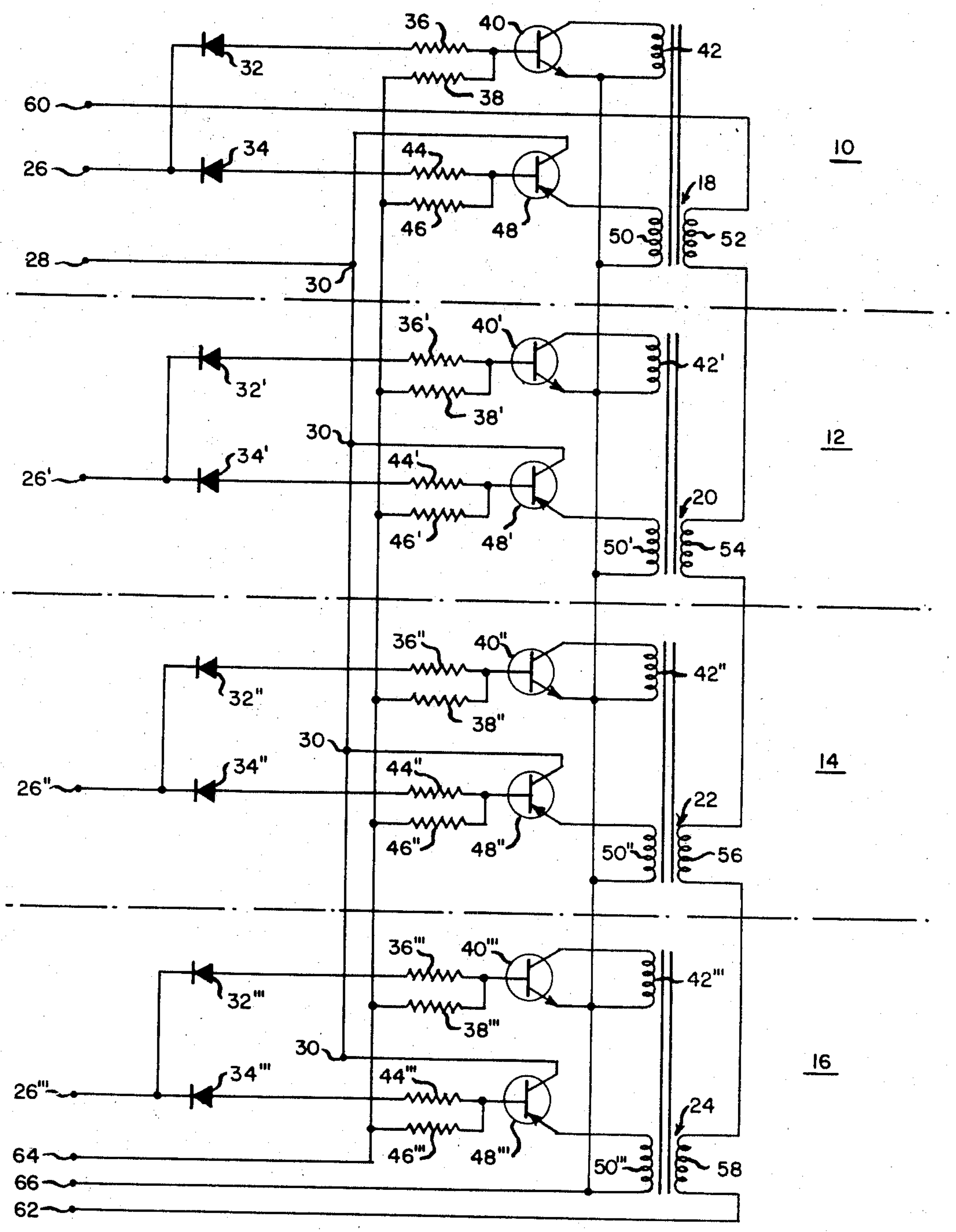
INVENTOR
Schuyler Kase
By Hooper, Leonard & Bell
his attorneys

United States Patent Office 3,426,345

Patented Feb. 4, 1969

3,426,345

STATIC DIGITAL TO ANALOG CONVERTERS

Schuyler Kase, 224 Sunset Drive, Pittsburgh, Pa. 15235

Continuation-in-part of application Ser. No. 241,331, Nov. 30, 1962. This application Dec. 24, 1964, Ser. No. 420,957

U.S. Cl. 340—347 4 Claims

Int. Cl. H04l *3/00;* H03k *13/00*

ABSTRACT OF THE DISCLOSURE

A static digital to analog converter with a plurality of bit circuits converts a digital signal to an AC analog output voltage. An AC voltage is applied to the input of each bit circuit when a digital signal is present at the input and a resulting AC analog output voltage is produced. When the digital signal is absent at the input, the AC impedance of the secondary output winding is removed in the particular bit circuit.

This invention relates to digital to analog converters and particularly to a static digital to analog converter free from summing resistors and usable over a wide temperature range and a broad band of voltage frequencies. This invention is a continuation-in-part of my co-pending application Ser. No. 241,331, now Patent No. 3,247,431 filed Nov. 30, 1962.

Static digital to analog converters hereinafter referred as "converter" heretofore used have relied upon summing resistors, usually precision wire wound and accurately matched in characteristics, combined with complex solid state circuitry. The prior art converters were subject to inaccuracies due to changes in temperature. The present invention eliminates these basic inaccuracies of prior are converters and provides such converter in a highly stable and highly accurate operative form. In addition this converter converts digital information to AC analog information directly. This converter also eliminates the need for power amplifiers in power transmission and serializing.

In general my converter is a summing circuit as disclosed in my co-pending application Ser. No. 241,331 to which has been added a shorting winding. An AC signal reference input is connected to one transistor that acts as the "on" and "off" AC switch. Another transistor is connected across the shorting winding. When a digital input signal is introduced, the AC reference passes through the summing circuit. The shorting transistor is open at this time. When the digital input signal is removed, the shorting transistor shorts the summing circuit while the other transistor opens the AC reference input. This describes the operation of one bit, subsequent bits are added in digital parallel and analog series.

I provide a static digital to analog converter having a selected digital DC voltage input and producing an analog voltage output which comprises a plurality of transformers having input and output windings, a source of AC, and means switching the AC source to the transformers when a digital signal is applied to the means, and the means switching the AC source "off" the transformers when the digital signal is removed from the means.

I preferably provide that when the digital signal is removed from the switching means, the switching means electrically shorts the input windings.

I provide a plurality of bit circuits in parallel, each of which comprises a transformer, having two input windings with a transistor emitter collector connected across one input winding and a transistor in series with another input winding. I provide a source of AC to the emitter or collector transistors in series with the input windings.

I provide a method of converting digital information to analog information which comprises applying an AC voltage to a plurality of transformers, applying digital voltage to a switch which in turn applies AC voltage to a corresponding transformer, removing all transformers electrically from the circuit which do not have digital voltage information applied to them which comprises shorting a winding on the transformer core when the digital voltage information is removed, and adding the voltages across the secondary windings to produce a total resultant analog voltage. I prefer to scale the output voltage by each transformer by adjusting the turns in order to obtain the proper output.

In the foregoing generalized description of my invention I have attempted to set out certain objects, purposes and advantages of my invention. Other objects, purposes and advantages will be evident, however, from a consideration of the following description and the accompanying drawing in which:

FIGURE 1 is a schematic of the static digital to analog converter.

(I) *Circuit description*

Referring to FIGURE 1 which is a schematic diagram of a static digital to analog converter, the description of the circuit is a follows:

The circuit comprises four bit circuits generally shown as 10, 12, 14 and 16. Each bit circuit is identical with the exception of the turn ratios of transformers 18, 20, 22 and 24. Bit circuit 10 has a digital signal input terminal 26 and an AC reference terminal 28 which is common at junction 30 to all four bit circuits. Diodes 32 and 34 are connected in parallel at the digital signal input terminal 26. A base bias resistor 36 is connected to the cathode of the diode 32. A base bias resistor 38 is in series with base bias resistor 36. Both are connected at one end to the base of transistor 40. The transistor 40 when conducting shunts the input winding 42 of the transformer 18 across the emitter and collector of the transistor 40. Base bias resistors 44 and 46 are connected in series with respect to each other, both being connected at one end to the base of transistor 48. The transistor 48 is connected in series with transformer 18 with input winding 50 of transformer 18. The transformer 18 has an output winding 52. Output winding 52 is connected in series with the output windings 54, 56 and 58 of the other bit circuits. The output windings 52, 54, 56 and 58 have analog output terminals 60 and 62. The DC bias is applied to the DC bias base resistors 36, 38, 44 and 46 at the DC bias input terminal 64. The DC bias to the base bias resistors in the other bit circuits is applied from the same terminal 64. Terminal 66 is the AC reference common, DC common and the digital signal input common to all bit circuits. This is a full description of all the parameters in one bit circuit. Bit circuits 12, 14 and 16 have identical parameters identified by numerals in prime fashion. This comprises four bit circuits. Any number of additional bits can be added in a similar manner.

(II) *Operation*

The operation of bit circuit 10 described above is as follows:

In the absence of a digital signal at terminal 26, an AC reference voltage is applied at terminal 28 and a DC voltage is applied at the DC bias input terminal 64. The DC bias which is applied at terminal 64 is developed across base bias resistors 36 and 38 producing a bias voltage which causes transistor 40 to conduct collector to emitter. The bias voltage produced across base bias resistors 44 and 46 at transistor 48 is such as to make transistor 48 nonconductive between collector and emitter. When a negative digital signal is applied at the digital input signal terminal 26, when the circuit is in the state previously described, this signal overdrives the bias produced across base bias resistors 36, 38, 44 and 46. Transistor 40, which was previously conducting or "shorting" input winding 42, is now non-conducting and thereby electrically removes the short across input winding 42. Transistor 48 previously non-conducting is now conducting AC between collector and emitter thereby causing an induced voltage across output winding 52. The voltage at the output winding 52 is developed between terminals 60 and 62. The other bit circuits 12, 14 and 16 operate in identically the same manner. Therefore, if a digital signal is placed at terminals 26, 26′, 26″ and 26‴ a voltage which is called the analog voltage will be produced across windings 52, 54, 56 and 58, whereby a total resultant analog voltage is produced between terminals 60 and 62 which is the analog equivalent of the digital input.

If windings 42, 42′, 42″, and 42‴ were not present, whenever a digital signal is removed from any one of the bit circuits, the losses produced at the output windings of any one of the inoperative (absent of digital signal) bit circuits would almost if not entirely attenuate the analog voltage that may be produced across an output winding of an operative (one with a digital signal applied) bit circuit. In this situation an almost zero voltage reading would be produced between terminals 60 and 62. To eliminate this problem, windings 42, 42′, 42″ and 42‴ with their corresponding "shorting" or "shunting" transistors have been placed in the circuit so that when a digital signal is not present in any one particular bit circuit, the transistor shunted across that input winding electrically removes the inductive load across the output winding of that particular bit circuit.

It is to be understood that any suitable switch which can be made sensitive to the presence of a digital signal voltage can be used in place of the transistor.

In the foregoing specification, I have set out a preferred practice and embodiment of my invention. It will be understood, however, that this invention may be otherwise embodied within the scope of the following claims.

I claim:

1. A static digital to analog converter which converts a digital signal to an analog output voltage which comprises a plurality of bit circuits each bit circuit having their inputs in parallel with each other and their outputs in series with each other and each bit circuit having:
- (1) a separate transformer core having a primary winding and a secondary output winding, the secondary output winding is connected in series with each of the secondary output windings of the other bit circuits;
- (2) means for accepting a digital signal input;
- (3) a source of AC;
- (4) means applying the AC source to the primary winding when a digital signal is present; and
- (5) means removing the AC impedance of the secondary winding when the digital signal is absent.

2. A static digital to analog converter which converts a digital signal to an analog output voltage which comprises a plurality of bit circuits each bit circuit having their inputs in parallel with each other and their outputs in series with each other and each bit circuit having:
- (1) a separate transformer core having a primary winding and a secondary output winding, the secondary output winding is connected in series with each of the secondary output windings of the other bit circuits;
- (2) a transistor connected in series with the primary winding;
- (3) a source of AC applied to the transistor;
- (4) means biasing the transistor to be in a nonconductive state and nonconductive of the AC to the primary winding;
- (5) means removing the AC impedance of the secondary winding when the transistor is nonconductive and reinserting the impedance when the transistor is saturated and conducting AC to the primary winding; and
- (6) means coupling a digital input signal to the transistor in such a manner that when there is a digital signal the bias on the transistor is reversed to produce a state of saturation which conducts the AC from the transistor to the primary winding and thereby produces an analog AC output at the secondary winding.

3. A static digital to analog converter which converts a digital signal to an analog output voltage which comprises a plurality of bit circuits each bit circuit having their inputs in parallel with each other and their outputs in series with each other and each bit circuit having:
- (1) a separate transformer core having first and second primary windings and a secondary output winding, the secondary output winding is connected in series with each of the secondary output windings of the other bit circuits;
- (2) a source of AC;
- (3) means for receiving a digital input signal;
- (4) means shorting the first primary winding when a digital signal is absent whereby the AC impedance of the secondary is removed; and
- (5) means applying the AC source to the second primary winding when a digital signal is present whereby an AC analog voltage is produced at the output.

4. A static digital to analog converter which converts a digital signal to an analog output voltage which comprises a plurality of bit circuits each bit circuit having their inputs in parallel with each other and their outputs in series with each other and each bit circuit having:
- (1) a separate transformer core having first and second primary windings and a secondary output winding, the secondary output winding is connected in series with each of the secondary output windings of the other bit circuits;
- (2) a first transistor connected across the first primary winding in parallel;
- (3) a second transistor connected in series with the second primary winding;
- (4) means biasing the first and second transistors such that the first transistor is saturated and shorts the first primary winding effectively removing the AC impedance of the secondary output winding, the means biasing causes the second transistor to be nonconducting causing an open circuit between the second transistor and the second primary winding;
- (5) a source of AC applied to the second transistor; and
- (6) means coupling the digital input signal to the bases of the first and second transistors in such a manner that when there is a digital signal the biases on each of the first and second transistors are reversed to produce a change in the first transistor to a nonconductive condition whereby the first primary winding is open and a change in the second transistor to a state of saturation which conducts the AC from the second transistor to the second primary winding and thereby produces an analog AC output.

References Cited

UNITED STATES PATENTS

| | | | |
|---|---|---|---|
| 2,970,308 | 1/1961 | Stringfellow et al. | 340—347.1 |
| 3,243,725 | 3/1966 | Raposa et al. | 317—16 |
| 3,263,150 | 7/1966 | Britten et al. | 317—148.5 |

MAYNARD R. WILBUR, *Primary Examiner.*

J. GLASSMAN, *Assistant Examiner.*